United States Patent Office 2,930,766
Patented Mar. 29, 1960

2,930,766

PRODUCTION OF A SUPPORTED CATALYST

Richard Norman Lacey, Hull, England, assignor to The Distillers Company Limited, Edinburgh, Scotland, a company of Great Britain No Drawing. Application February 18, 1957
Serial No. 640,616

Claims priority, application Great Britain March 6, 1956

6 Claims. (Cl. 252—473)

The present invention relates to the production of supported catalysts and in particular to the production of catalysts suitable for the selective hydrogenation of unsaturated aldehydes.

The catalytic hydrogenation of unsaturated aldehydes, such as crotonaldehyde, to the corresponding saturated aldehydes is well known. Particularly suitable catalysts for this reaction are the platinum group metals deposited on a solid supporting material such as magnesia or pumice. In my copending application Serial No. 640,577, filed on even date herewith, corresponding to B.A. 6541/56, is described a process for the preparation of catalysts of this type.

When ethylenically unsaturated aldehydes are hydrogenated using platinum group metal catalysts of the type known in the art, it is found that although good yields of the corresponding saturated aldehydes can be obtained, the product is frequently associated with a considerable proportion of by-products such as carbon monoxide and unsaturated hydrocarbons. The presence of such by-products is undesirable especially since they are formed from the unsaturated aldehyde undergoing hydrogenation at the expense of the desired saturated aldehyde. When crotonaldehyde, for example, is hydrogenated in this way the n-butyraldehyde which is produced is associated with approximately a 5% loss to carbon monoxide and propylene.

It is an object of the present invention to provide an improved catalyst of this type in the presence of which the conversion of ethylenically unsaturated aldehydes to saturated aldehydes takes place with reduced formation of undesired by-products.

According to the present invention, the process for the production of a supported catalyst comprises depositing an oxide of a platinum group metal on solid mildly alkaline supporting material, treating the resulting product with an aqueous solution of an alkali metal hydroxide, carbonate or bicarbonate, and reducing the oxide of the platinum group metal to the corresponding metal.

The term "oxide" as used herein in connection with platinum group metals, includes not only the oxides as such, but also hydroxides and mixtures containing the oxide and hydroxide. In certain cases, in which the deposition medium is of an easily oxidisable nature, the element may be deposited as the metal. By the term "platinum group metal" is meant an element from the group consisting of ruthenium, rhodium, palladium, osmium, iridium and platinum. The compounds of these metals which are used in the process of the invention are such that they can be hydrolysed during the process and that either they or other compounds of the same metal to which they can be converted are soluble in the organic solvents used.

It is an essential feature of the invention that the supporting material used is mildly alkaline. By the expression "mildly alkaline supporting material" is meant supporting material which is either a substantially water-insoluble oxide, hydroxide, basic oxide, carbonate or basic carbonate of a metallic element, examples of such a material being alumina, magnesia, titania and chromia, or is a more neutral and more inert material, such as charcoal, silica gel and pumice, which is pre-treated with an aqueous alkaline reagent and then dried, in either case the alkalinity being such that substantially none of the alkali present is transferred from the supporting material to the organic solvent used as the medium for the deposition of the oxide of the platinum group metal. The mild alkalinity may thus either be an intrinsic property of the supporting material, an example of this kind of material being magnesia, or it may be imparted to a more neutral and more inert material, such as charcoal, by pre-treating it with an aqueous alkaline reagent. Magnesia and other naturally mildly alkaline materials used as supports can also be pre-treated if desired in this way. The aqueous alkaline reagent used is preferably an aqueous solution of the hydroxide, carbonate or bicarbonate of an alkali metal such as sodium or potassium. The pre-treatment may be carried out by steeping the material in the alkaline reagent, preferably at an elevated temperature. The supporting material so treated is then dried before being used in the process of the invention. Of the materials exemplified above, magnesia and pumice are particularly suitable for use in the process of the present invention.

Deposition of the oxide of the platinum group metal on the supporting material is preferably carried out by means of the process described in the aforesaid co-pending application. In this process deposition of the oxide of the platinum group metal on the supporting material is carried out in a medium consisting of an organic solvent which is largely free of water. In these circumstances, the solubilities of the mildly alkaline supporting material and of the mildly alkaline reagent with which the supporting material may have been pre-treated are so small that substantially none of the alkali present in the supporting material is transferred to the liquid phase. Furthermore, many compounds of the platinum group metals which are suitable for use in the process are easily soluble in organic solvents. Therefore, in the deposition process, the compound of the platinum group metal is able to migrate to the alkaline surface of the supporting material but the alkali in the supporting material is substantially unable to migrate to the liquid phase. Undesirable precipitation of oxide away from the supporting material is thus avoided and the deposition on the supporting material is achieved in an efficient manner. A firmly adhering coating of deposited oxide of the platinum group metal on the supporting material is obtained. Thus in the production of a palladium/magnesia catalyst, magnesia is treated at an elevated temperature with a solution, for example, of palladous chloride in an organic solvent, such as acetone, ethyl methyl ketone, or diethyl ketone, whereby a deposit of firmly adhering palladium oxide is formed on the magnesia.

The deposition is carried out preferably at an elevated temperature and can often be accomplished satisfactorily at the boiling point of the organic solvent used under reflux. However, the optimum working temperature depends to some extent on the proportion of water present in the organic phase in which the process takes place. If the water content of the organic phase is small, the rate of deposition may be slow; in this case the process can be operated at a faster rate by working at a more elevated temperature. The presence of a larger water content brings about a faster rate of deposition even when the process is operated at a comparatively low temperature, but at the same time promotes undesired precipitation in the liquid phase away from the supporting material. The water content of the solvent is accordingly arranged to lie within convenient working limits using a convenient working temperature and is preferably arranged to be between 1 and 10–15% by volume. The organic solvents which may be used in the invention either singly or in mixtures of two or more include lower primary and secondary monohydric alcohols, such as methanol, ethanol, n-propanol, isopropyl alcohol, n-butanol, secondary butyl alcohol and isobutyl alcohol; lower ketones such as acetone, ethyl methyl ketone and di-ethyl ketone; lower esters such as methyl formate, methyl acetate, ethyl formate and ethyl acetate; glycol ethers such as 2-ethoxyethanol and 2-butoxyethanol; water soluble ethers such as dioxan and dihydropyran; certain of the more water-soluble acetals; and glycols of comparatively high molecular weight, such as hexylene glycol and 2-ethylhexan-1:3-diol, wherein the higher molecular weight tends to offset the hydrophilic character of the glycol group. Glycols of comparatively low molecular weight, such as ethylene glycol, and also glycerol, when used in the process of the invention gives rise to excessive precipitation in the liquid phase, presumably because the alkali present in the supporting material is sufficiently soluble in these highly hydrophilic solvents to permit the migration of alkali to the liquid phase. Of the solvents listed above, acetone, ethyl methyl ketone and di-ethyl ketone are particularly useful in the process of the invention. The amount of water which may be present in any of these organic solvents in order that a convenient rate of deposition is obtained at a convenient working temperature while preferably lying between the limits given previously, depends on the nature of the particular solvent and on the particular platinum group metal used. Thus methanol with 10% of water proved serviceable but the same solvent with only 1% of water present was unsuitable. Ethanol with 1% of water, on the other hand, proved to be a good medium for the deposition process. n-Propanol and isopropyl alcohol are satisfactory solvents with about 10% of water present, but if only 1% of water is present certain compounds of the platinum group metals such as palladous chloride are insufficiently soluble. Similarly n-butanol, secondary butyl alcohol and isobutyl alcohol can be used with 5–10% water present, but if only 1% water is present the solubility of compounds such as palladous chloride is insufficient to allow this solvent mixture to be useful.

An example of the platinum group metal which can be used in the preparation of hydrogenation catalyst according to the process of the invention is palladium. This metal is preferably supplied to the deposition reaction as palladous chloride or sodium chloropalladite. Palladous chloride is readily soluble in aqueous sodium chloride solution to give a solution of sodium chloropalladite; addition of an organic solvent, such as acetone, to this solution results in the formation of a solution of palladous chloride, and, if there is only a limited amount of water present, to the subsequent precipitation of much of the sodium chloride, as indicated in the equation

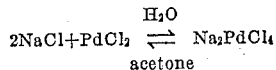

acetone

Sodium chloropalladite may be dissolved in the minimum of water and addition of acetone results in precipitation of sodium chloride as shown in the above equation.

When the deposition process has been completed, the supporting material coated with the oxide of the platinum group metal is separated from the organic solvent phase and may then be washed with water and dried. The washing procedure can be carried out so that a large proportion of the chloride present is removed. The coated supporting material thus obtained containing only a small proportion of chloride has been found, when the deposited oxide has been reduced, to afford a catalyst which is particularly useful in the hydrogenation reactions for which the catalysts prepared according to the present invention are intended, good yields of the desired hydrogenated product being obtained.

The coated supporting material so obtained is then impregnated with the aqueous solution of the hydroxide, carbonate or bicarbonate of an alkali metal such as sodium or potassium. The concentration of alkali in the solution is not critical and concentrations of about 1% by weight are suitable. The treatment is carried out by allowing the coated supporting material to stand in the alkali solution for some time until the material is suitably impregnated with the alkali, the actual time which is required for impregnation depending on the nature of the supporting material used. When this process is completed the coated and impregnated supporting material is washed with water and then dried.

The alkali treatment can be conveniently carried out on the coated supporting material when the deposition of the oxide of the platinum group metal has been completed and after the material has been washed with water.

Reduction of the deposited oxide to give the catalytically active metal can be carried out before or after the alkali treatment by a process separate from the hydrogenation reaction in which the catalyst is to be used; alternatively, the coated and impregnated material can be charged to the reactor in which it is intended to carry out the hydrogenation, and reduction of the deposited oxide to the catalytically active metal can be effected, for example, by passing hydrogen into the reactor, so that the reduction is carried out immediately prior to the beginning of the hydrogenation.

Catalysts prepared according to the process described can be arranged to be in the form of powder or in tablet or in granular form. The proportion of the active platinum group metal present in the prepared supported catalyst can be varied according to the purpose for which the catalyst is intended. Catalysts prepared in the manner described which contain active platinum group metal in the range of 0.01 to 5% by weight based on the total weight of supported catalyst are particularly suitable for the hydrogenation of crotonaldehyde to n-butyraldehyde.

I have found that by using the improved catalysts, considerably lower proportions of hydrocarbons are formed as by-products; the proportion of crotonaldehyde on the n-butyraldehyde produced lost as gaseous by-products, for example, can be reduced to 1.5 to 2.0% by weight.

The following example illustrates a method by which the process of the invention may be carried out. Parts by weight shown therein bear the same relation to parts by volume as do kilograms to litres. The percentages given are by weight except where otherwise stated.

*Example*

1000 parts by volume of magnesia of ¼″–⅛″ mesh obtained by calcining magnesite is added to 1000 parts by volume of a 5% aqueous sodium carbonate solution. The mixture is maintained at 100° C. for 10 minutes after which time the supporting material is removed and dried; the material which passes through a sieve of ⅛″ mesh is rejected.

3.34 parts by weight of palladous chloride and 2.24 parst by weight of sodium chloride are dissolved in 7.98 parts by weight of water and the solution is diluted with 200 parts by volume of acetone. The sodium chloride, which is thereby precipitated, is removed by filtration and the solution is further diluted with acetone to 400 parts by volume.

To the pre-treated supporting material is then added 400 parts by volume of the palladous chloride solution as prepared above, 200 parts by volume of acetone and 30 parts by volume of water. The mixture is gently refluxed for a period of 4 hours. Deposition of palladium oxide takes place on the supporting material. When this deposition has been completed the liquid phase is drawn off and the catalyst is washed with water at the rate of 25 parts by volume of water per part by volume of catalyst for a period of 4 hours.

Water is then drained from the material and 1000 parts by volume of a 1% aqueous sodium carbonate solution is added. After allowing this to stand for 16 hours the aqueous phase is removed and the catalyst washed with 1000 parts by volume of water and dried.

The catalyst is then charged to a reactor in which the hydrogenation reaction is to take place. The palladium oxide is reduced by passing a stream of nitrogen through the reactor at the temperature to be used in the hydrogenation and then gradually introducing hydrogen. The rate of flow of gas is arranged to be 200 parts by volume per part by volume of catalyst per hour and in each of the first five successive half-hourly periods from the beginning of the introduction of hydrogen, the gas stream contains 5, 10, 20, 50 and 100% by volume of hydrogen.

By this process, an active palladium catalyst is prepared which contains about 0.2% w./v. palladium based on the total volume of the supported catalyst.

Wet crotonaldehyde (94%) was fed at the rate of 35 parts by volume per hour to a vapouriser where the aldehyde was evaporated and mixed with hydrogen fed at the rate of 20,000 parts by volume per hour. The mixture of hydrogen and aldehyde vapour was passed at atmospheric pressure over 100 parts by volume of the prepared catalyst placed in a reactor heated by an oil jacket and maintained at 140° C.

The hydrogenation was allowed to proceed for 1000 hours. Throughout the run the conversion figure was at least 99%. After the first 50 hours the yield of n-butyraldehyde was 95%, the yield of gaseous by-products being only 1.55%.

I claim:

1. A process of producing a supported catalyst which comprises steeping a supporting material selected from the group consisting of alumina, magnesia, titania, chromia, charcoal, silica gel and pumice in an aqueous solution of an alkali selected from the group consisting of hydroxides, carbonates and bicarbonates of alkali metals, recovering and then drying the steeped supporting material and heating the dried supporting material at a temperature below 250° C. with a solution of a compound of a platinum group metal in an organic solvent selected from the group consisting of acetone, ethyl methyl ketone and diethyl ketone, thereby depositing an oxide of the platinum group metal on the supporting material, heating the resulting product with an aqueous solution of a substance selected from the group consisting of hydroxides, carbonates and bicarbonates of alkali metals, and thereafter reducing the oxide of the platinum group metal to the corresponding metal.

2. A process of producing a supported catalyst which comprises steeping a supporting material selected from the group consisting of alumina, magnesia, titania, chromia, charcoal, silica gel and pumice in an aqueous solution of an alkali selected from the group consisting of hydroxides, carbonates and bicarbonates of alkali metals, recovering and then drying the steeped supporting material and heating the dried supporting material at a temperature below 250° C. with a solution of a palladium compound in an organic solvent selected from the group consisting of acetone, ethyl methyl ketone and diethyl ketone, thereby depositing an oxide of palladium on the supporting material, heating the resulting product with an aqueous solution of a substance selected from the group consisting of hydroxides, carbonates and bicarbonates of alkali metals, and thereafter reducing the oxide of palladium to palladium.

3. A process of producing a supported catalyst which comprises steeping magnesia in an aqueous solution of an alkali selected from the group consisting of hydroxides, carbonates and bicarbonates of alkali metals, recovering and then drying the steeped magnesia and heating the dried magnesia at a temperature below 250° C. with a solution of a palladium compound in an organic solvent selected from the group consisting of acetone, ethyl methyl ketone and diethyl ketone, thereby depositing an oxide of palladium on the magnesia, heating the resulting product with an aqueous solution of a substance selected from the group consisting of hydroxides, carbonates and bicarbonates of alkali metals, and thereafter reducing the oxide of palladium to palladium.

4. A process of producing a supported catalyst which comprises steeping magnesia in an aqueous solution of sodium carbonate, recovering and then drying the steeped magnesia and heating the dried magnesia at a temperature below 250° C. with a solution of a palladium compound in an organic solvent selected from the group consisting of acetone, ethyl methyl ketone and diethyl ketone, thereby depositing an oxide of palladium on the magnesia, heating the resulting product with an aqueous solution of sodium carbonate, and thereafter reducing the oxide of palladium to palladium.

5. A process of producing a supported catalyst which comprises steeping a supporting material selected from the group consisting of alumina, magnesia, titania, chromia, charcoal, silica gel and pumice in an aqueous solution of an alkali selected from the group consisting of hydroxides, carbonates and bicarbonates of alkali metals, recovering and then drying the steeped supporting material and heating the dried supporting material at a temperature below 250° C. with a solution of palladous chloride and sodium chloride in a mixture of water and an organic solvent selected from the group consisting of acetone, ethyl methyl ketone and diethyl ketone, thereby depositing an oxide of the platinum group metal on the supporting material, heating the resulting product with an aqueous solution of a substance selected from the group consisting of hydroxides, carbonates and bicarbonates of alkali metals, and thereafter reducing the oxide of the platinum group metal to the corresponding metal.

6. A process of producing a supported catalyst which comprises steeping magnesia in an aqueous solution of sodium carbonate, recovering and then drying the steeped magnesia and heating the dried magnesia at a temperature below 250° C. with a solution of a palladium compound in acetone, thereby depositing an oxide of palladium on the magnesia, heating the resulting product with an aqueous solution of sodium carbonate, and thereafter reducing the oxide of palladium to palladium.

References Cited in the file of this patent

UNITED STATES PATENTS

| | | |
|---|---|---|
| 1,222,660 | Paal | Apr. 17, 1917 |
| 2,030,283 | De Rewal | Feb. 11, 1936 |
| 2,123,732 | Keitel et al. | July 12, 1938 |
| 2,475,155 | Rosenblatt | July 5, 1949 |
| 2,651,598 | Ciapetta | Sept. 8, 1953 |
| 2,749,359 | Calkins et al. | June 5, 1956 |